US008856249B2

(12) United States Patent
Liberty et al.

(10) Patent No.: US 8,856,249 B2
(45) Date of Patent: Oct. 7, 2014

(54) METHOD AND SYSTEM FOR EMAIL SEQUENCE IDENTIFICATION (75) Inventors: Edo Liberty, Tel Aviv (IL); Zohar S. Karnin, Herzelia (IL); Yoelle Maarek, Haifa (IL)

(73) Assignee: Yahoo! Inc., Sunnyvale, CA (US)

(*) Notice: Subject to any disclaimer, the term of this patent is extended or adjusted under 35 U.S.C. 154(b) by 139 days.

(21) Appl. No.: 13/479,790

(22) Filed: May 24, 2012

(65) Prior Publication Data
US 2013/0318172 A1    Nov. 28, 2013

(51) Int. Cl.
G06F 15/16    (2006.01)
H04L 12/58   (2006.01)
G06Q 10/10   (2012.01)

(52) U.S. Cl.
CPC ............... H04L 12/58 (2013.01); G06Q 10/10 (2013.01)
USPC ........................... 709/206; 709/224

(58) Field of Classification Search
CPC ................. H04L 12/58; G06Q 10/10
USPC .............. 709/200–206, 217–227, 228
See application file for complete search history.

(56) References Cited

U.S. PATENT DOCUMENTS

| | | | |
|---|---|---|---|
| 7,143,091 B2 | 11/2006 | Charnock et al. | |
| 7,222,156 B2* | 5/2007 | Gupta et al. | 709/206 |
| 7,904,336 B2 | 3/2011 | McGregor et al. | |
| 8,347,313 B2* | 1/2013 | Hare et al. | 719/313 |
| 8,521,780 B2* | 8/2013 | Arora et al. | 707/791 |
| 2007/0100947 A1* | 5/2007 | Chen et al. | 709/206 |
| 2010/0169888 A1* | 7/2010 | Hare et al. | 718/102 |
| 2012/0011448 A1 | 1/2012 | Tse | |
| 2012/0089550 A1* | 4/2012 | Arora et al. | 706/47 |
| 2012/0179762 A1* | 7/2012 | Arora et al. | 709/206 |
| 2013/0041912 A1* | 2/2013 | Arora et al. | 707/769 |
| 2013/0046840 A1* | 2/2013 | Karkera et al. | 709/206 |
| 2013/0124643 A1* | 5/2013 | DeLuca et al. | 709/206 |
| 2013/0238521 A1* | 9/2013 | Graupner et al. | 705/345 |
| 2014/0025693 A1* | 1/2014 | Arora et al. | 707/755 |

FOREIGN PATENT DOCUMENTS

JP       2006302146     11/2006
KR    1020090123342    12/2009

OTHER PUBLICATIONS

International Search Report (PCT/US2013/038578) dated Sep. 13, 2013; 3 pages.
Crispin et al., "Internet Message Access Protocol—SORT and THREAD Extensions", RFC 5256, Jun. 2008, pp. 1-19.
Crocker, "Standard for the Format of ARPA Internet Text Messages", RFC # 822, Obsoletes: RFC #733 (NIC #41952), Aug. 13, 1982, pp. 1-47.

(Continued)

Primary Examiner — Moustafa M Meky
(74) Attorney, Agent, or Firm — James J. DeCarlo; Greenberg Traurig, LLP (57) ABSTRACT A system and method for identifying causal email threading. In one aspect, a computing device identifies a plurality of email templates, each email template corresponding to characteristics of a received machine-generated email, the characteristics of the received machine-generated email relating to static data of the machine-generated email. The computing device generates a template causality graph by analyzing the plurality of email templates to determine a statistical causality between templates of the plurality of email templates, the determining of the statistical causality between templates comprising determining that a first received machine-generated email associated with a first template is a result of a second received machine-generated email associated with a second template.

12 Claims, 8 Drawing Sheets

(56) References Cited

OTHER PUBLICATIONS

Hall et al., "The WEKA Data Mining Software: An Update", SIGKDD Explorations vol. 11, Issue 1, pp. 10-18.

Hipp et al., "Algorithms for Association Rule Mining—A General Survey and Comparison", SIGKDD Explorations, Jul. 2000, vol. 2, Issue 1, pp. 58-61.

Klensin, "Simple Mail Transfer Protocol", RFC 5321, SMTP, Oct. 2008, pp. 1-95.

Lewis et al., Threading Electronic Mail: A Preliminary Study', Information Processing & Management, vol. 33, No. 2, pp. 209-217, 1997.

Minkov et al., "Contextual Search and Name Disambiguation in Email Using Graphs", SIGIR'06, Aug. 6-11, 2006, Seattle, Washington, pp. 27-34.

Rebane et al., "The Recovery of Casual Poly-Trees from Statistical Data", 1987 Workshop on Uncertainty in Artificial Intelligence, University of Washington, Seattle, International Journal of Approximate Reasoning 1988; pp. 341.

Resnick, "Internet Message Format", Apr. 2001, RFC 2822, pp. 1-51.

Agrawal et al., "Mining Association Rules between Sets of Items in Large Databases", SIGMOD 5/93, Washington D. C., USA, pp. 207-216.

Wang et al., "Recovering Implicit Thread Structure in Newsgroup Style Conversations", Association for the Advancement of Artificial Intelligence, 2008, pp. 152-160.

Yeh et al., "Email Thread Reassembly Using Similarity Matching", CEAS 2006—Third Conference on Email and Anti-Spam, Jul. 27-28, 2006, Mountain View, California, pp. 1-8.

Zawinski, "message threading.", © 1997-2002, pp. 1-10.

\* cited by examiner

METHOD AND SYSTEM FOR EMAIL SEQUENCE IDENTIFICATION

FIELD

The present disclosure relates to email, and more specifically to a method and system for email sequence identification.

BACKGROUND

Message threading refers to the task of identifying sequences or threads of messages related to a single logical conversation, event or action. It has been typically used in newsgroups, discussion forums, and most notably in email. In email, the thread extension has been supported for a number of years in IMAP, the Internet Message Access Protocol, and several algorithms have been offered to implement this extension. Messages within a thread are typically organized chronologically. Most mail clients support threading today either under IMAP or in a more proprietary manner and typically visualize threads to ease reading, searching, browsing, labeling, etc. of the user's inbox.

The most common type of email threading is dialog based and identified through pure syntactic analysis. This type of threading demands from the messages in the thread to have been part of a dialog between senders and recipients. The dialog is easily identified through syntactic analysis of the subject as prefixes such as "Re:" or "Fw:" added to the subject line, and of the senders and recipients fields of the messages. For example, one email threading algorithm even defines threading as the action of "grouping messages together in parent/child relationships based on which messages are replies to which others." These subject, recipient, and sender fields are part of the header of a mail message as formally defined in the earliest mail transfer protocols such as SMTP. This type of threading requires a dialog to have happened and does not cover one directional communication where one or several senders address the same recipient(s) around the same topic and are conceptually part of the same conversation.

SUMMARY

Messages in a traditional thread require a return channel (e.g., the automated messages typically request the recipient not to respond). In other words, a dialog must occur between sender(s) and recipient. A sequence of inbound messages with no reply from the recipient might still be part of the same thread if attributed to a same cause. For example, a user asking to retrieve a lost password from some site may receive a message containing a special link for changing their password. Then, after they have changed the password, they receive another email informing them that the password has been successfully changed. These messages describe one action that spans several stages, hence they should be thought of as belonging to the same thread.

Also, two messages might originate from different senders and have entirely different subject lines. As such they cannot be identified as belonging to a same thread using purely syntax analysis of one's inbox in the traditional approach. We state that they should belong to the same thread if attributed to a same cause. For example, consider a purchase from a retailer generating a message thanking the buyer (with a receipt attached), then another message notifying them of shipment of their goods. If the user returns the item, another message would acknowledge its receipt by the vendor. All of these messages belong to the same logical action of purchasing an item. For example, a user can buy a product X from eBay using PayPal. The user will likely receive a confirmation email from eBay, a receipt email from PayPal, and a shipping notice from UPS. All of these email messages relate to a single purchase action, as such should be grouped into a same thread.

The present disclosure proposes a method for identifying a specific type of sequences that we coin "causal thread", where a message follows another message in the sequence, if we can demonstrate with a high level of confidence that the reception of the second message was caused by the reception of the first one. One element of the disclosure is that such causal threads are not based on pure syntactic analysis on one individual's inbox, but might require external knowledge (such as analyzing global mail exchange patters over hundreds of millions of mail users) to infer such causality.

In one aspect, a computing device identifies email templates, each email template corresponding to characteristics of a received machine-generated email, the characteristics of the received machine-generated email relating to static data of the machine-generated email. The computing device generates a template causality graph by analyzing the email templates to determine a statistical causality between templates of the email templates, the determining of the statistical causality between templates including determining that a first received machine-generated email associated with a first template is a result of a second received machine-generated email associated with a second template.

In one embodiment, the computing device receives, for an email account associated with a user, machine-generated email messages sent to the user, determines an email template for each of the machine-generated email messages, and determines that an email in the machine-generated email messages is part of an email thread based on the template causality graph for the email template.

In one embodiment, the computing device analyzes a time difference between the email and other email messages in the email thread or analyzes an email variable in the email to determine if the email variable matches an email variable in other email messages in the email thread.

In one aspect, a server computer receives, for an email account associated with a user, a machine-generated email sent to the user, the machine-generated email including static data. The server computer parses the machine-generated email to determine characteristics of the machine-generated email, the characteristics of the machine-generated email relating to the static data of the machine-generated email. The server computer then groups the machine-generated email in an email thread by statistically determining that the machine-generated email is a result of receiving another machine-generated email previously grouped in the thread, the statistical determining further including determining that a first parameter that the machine-generated email has and a second parameter that the other machine-generated email has match within a given threshold.

In one embodiment, the determining of the first parameter and the second parameter includes determining a time that the email and the other email were received or determining a value of variable data of the machine-generated email matches a value of variable data of the other machine-generated email. In one embodiment, the server computer transmits an advertisement with the received email, the advertisement targeted to a subject matter of the email thread. In one embodiment, the server computer generates a user profile for the user based on the email thread.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present disclosure is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
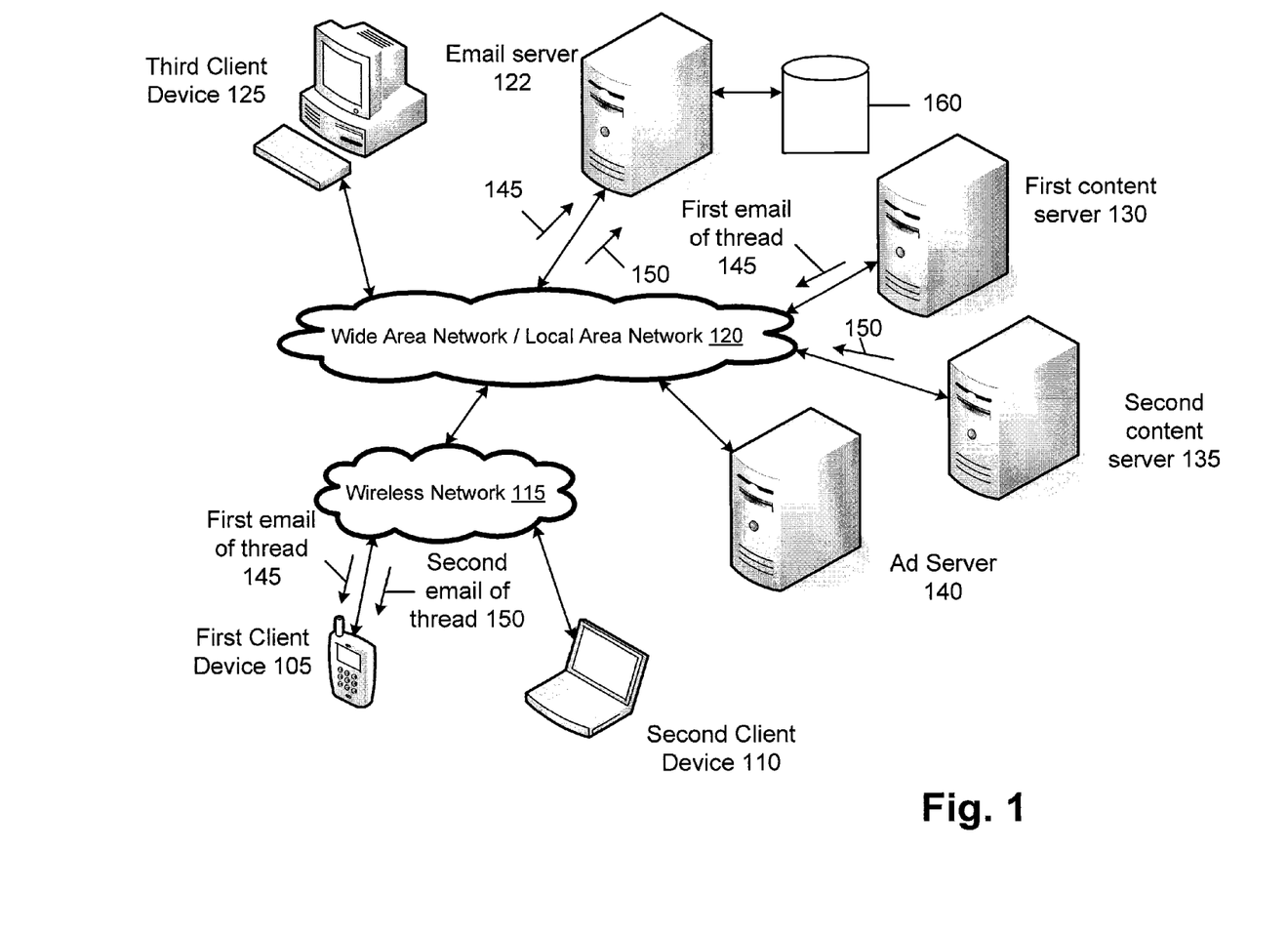
FIG. 1 is a block diagram of client devices communicating over a network with server computers in accordance with an embodiment of the present disclosure.

FIG. 1 is a schematic diagram illustrating an example embodiment of a network and devices implementing embodiments of the present disclosure. Other embodiments that may vary, for example, in terms of arrangement or in terms of type of components, are also intended to be included within claimed subject matter. FIG. 1 includes, for example, a first client device 105 and a second client device 110 in communication over a wireless network 115. The wireless network 115 is connected to a local area network (LAN)/wide area network (WAN) 120, such as the Internet, so that the first client device 105 and the second client device 110 can communicate with a third client device 125, an email server 122, a first content server 130 (also referred to below as first server computer 130 or first server 130), a second content server 135 (also referred to below as a second server computer 135 or second server 135) and/or an ad server 140. Although shown as a wireless network 115 and WAN/LAN 120, the first client device 105 and/or the second client device 110 can communicate with each other, the third client device 125 and/or servers 122, 130, 135, 140 via any type of network.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Email and/or content servers 122, 130, 135 may include a device that includes a configuration to provide content via a network to another device. An email server and/or content server 122, 130, 135 may, for example, host a site, such as a social networking site, examples of which may include, without limitation, Flickr®, Twitter®, Facebook®, LinkedIn®, or a personal user site (such as a blog, vlog, online dating site, etc.). An email server 122 and/or content server 130, 135 may also host a variety of other sites, including, but not limited to business sites, educational sites, dictionary sites, encyclopedia sites, wikis, financial sites, government sites, etc. In one embodiment, the email server 122 is the server that receives, stores, and transmits email messages sent to the client 105, 110, and/or 125. In one embodiment, the email server 122 is a server associated with a service provider, such as Yahoo!, with which the user has an account.

Server 122, 130, 135 may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a server include desktop computers, multiprocessor systems, microprocessor-type or programmable consumer electronics, etc.

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

In one embodiment, the first server computer 130 transmits a first machine-generated email 145 of a thread to the first client device 105 and the second server computer 135 transmits a second machine-generated email 150 of the same thread to the first client device 105. Although the first email 145 and the second email 150 are sent from two different servers 130, 135, it should be noted that the first email 145 and the second email 150 may instead be generated and transmitted by a single server (e.g., the first server 130). The email server 122 receives these email messages and transmits these email messages to the first client device 105. Although shown as a separate server, it should be noted that the email server 122 may alternatively be part of the first and/or second server 130, 135 and/or the first, second, and/or third client device 105, 110, 125.

Most of the content of machine generated email messages is typically template ("boilerplate") information, identically repeated over the different instances. The remainder of the content is typically created by replacing variables with information fetched from a database (e.g. names, addresses, dates, etc). By analyzing inbound traffic, it is possible to identify these near duplicate email messages and separate the template from the variables. Given an automated mail e, one can efficiently compute both a template identifier $\tau(e)$, and a list of variable values $vars(e)$. This functionality can be implemented using standard tools used in pattern recognition and market basket analysis. In one embodiment, each template corresponds to a regular expression matching the sender domain and subject line. For example, consider the message e corresponding to "usps.com: Your package number 2049862-56 is on its way". In one embodiment, $\tau(e)$ represents "usps.com: Your package number * is on its way" and vars(e) is a list containing a single element: "2049862-56".

Figure 2:
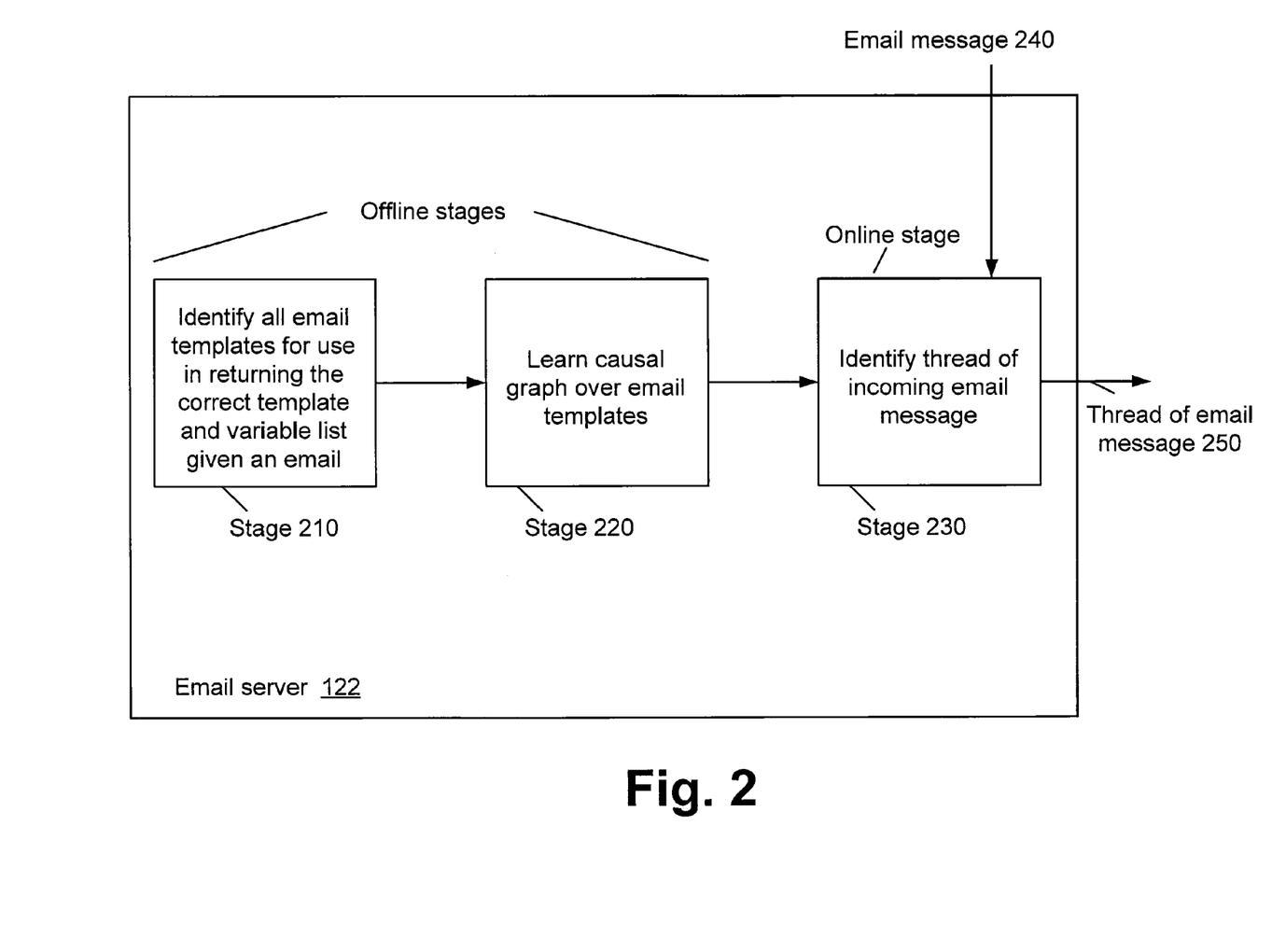
FIG. 2 is a block diagram of a server computer operating three stages to determine a thread of a received email message in accordance with an embodiment of the present disclosure.

Also referring to FIG. 2, in one embodiment there are three stages for determining the thread of an email message. Email server computer 122 executes two offline stages and one online stage. The first offline stage 210 includes, in one embodiment, identifying email templates and creating an efficient procedure that returns the correct template and variable list given an email. Each email template corresponds to characteristics of a received machine-generated email, the characteristics of the received machine-generated email relating to static data of the machine-generated email.

As described in more detail below, the second offline stage 220 is learning a causal graph over email templates. Given the causal graph, the likelihood that one email follows another can be determined. The third stage 230, which is online, involves receiving an email message 240. The third stage 230 provides each incoming email message 240 with a thread identification upon arrival. As described in more detail below, the threading is performed so as to maximize a utility function parameterized by the causal graph from the second stage 220. As the causal graph relating to many email messages is used to determine a thread of an email message, a "wisdom of the crowds" determination is used to ascertain a causal thread between email messages.

Figure 3:
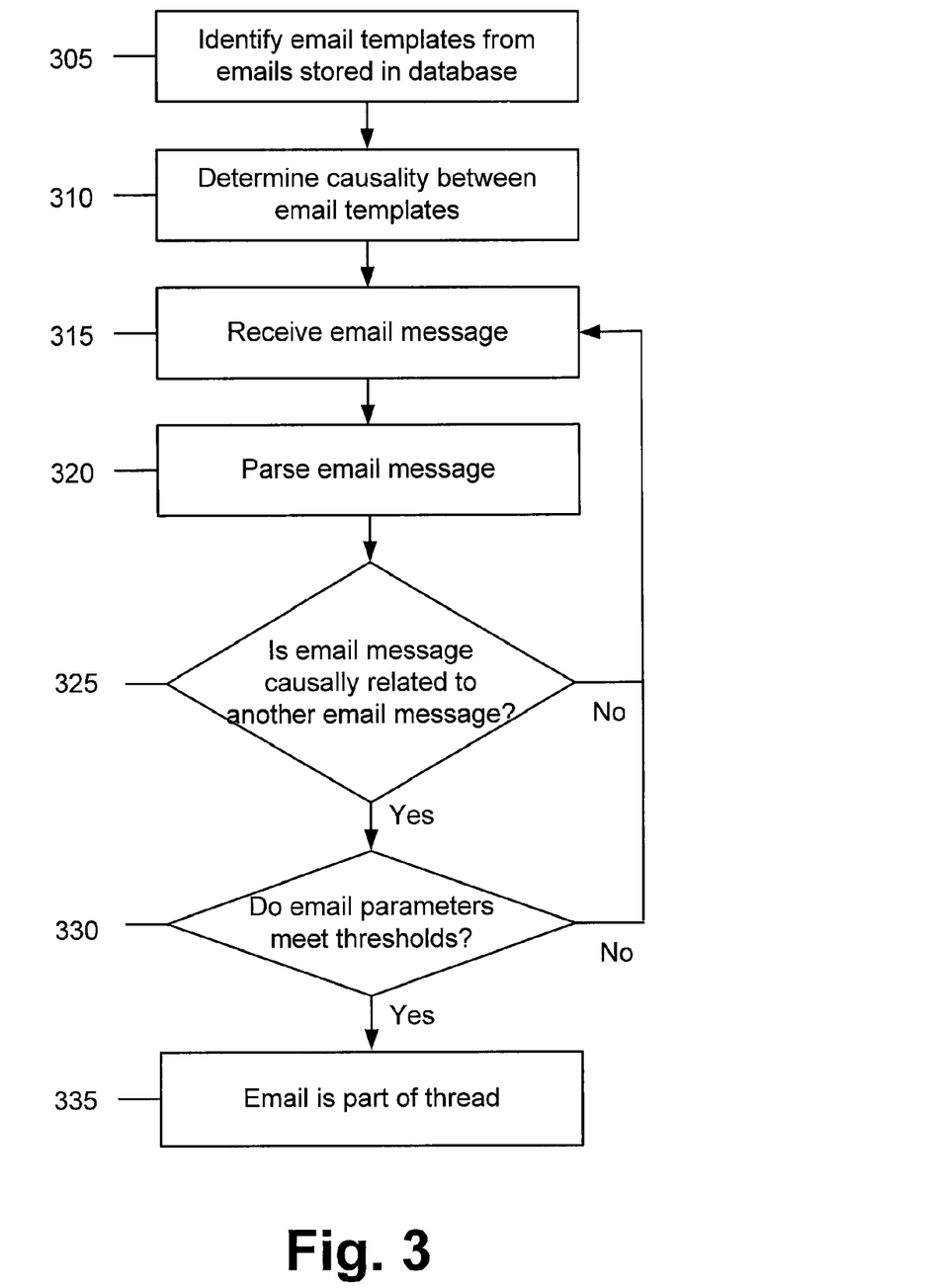
FIG. 3 is a flowchart illustrating steps performed by the server computer to determine the thread in accordance with an embodiment of the present disclosure.

FIG. 3 is a flowchart showing an embodiment of the steps performed by the email server computer 122. In one embodiment, the email server computer 122 identifies email templates from email messages stored in a repository, such as database 160 (Step 305). The database 160 can be located in the email server computer 122, the first or second content server 130, 135, one or more client devices 105, 110, 125, or can be in communication with the email server 122. The email server 122 then determines causality between email templates (Step 310), such as whether a second template is caused by a first template. As described in more detail below, the determination of causality between email templates is a statistical measure. In one embodiment, steps 305 and 310 occur offline. In one embodiment, the email server 122 then receives an email message (e.g., email message 145 or 150) (Step 315) and parses the email message (Step 320). The email server 122 then determines if the received email message is causally related to (e.g., caused by) another email message (Step 325). This is determined based on a comparison of the email message with the templates and the causality between the templates (as determined in steps 305 and 310). If not, the process returns to Step 315 and a new email message is received. If so, then, in one embodiment, the email server 122 determines if parameters associated with the email message meet predetermined thresholds (Step 330). For example, in one embodiment, the email server 122 determines the time that the email message was sent and compares this time to the time associated with the previous email that may have caused this email. If the difference in time period is above a given threshold, then this email message is probably not related to the previous email message. Other parameters that the email server 122 can review include the vendor that sent the email messages (e.g., both email messages are from eBay), a confidence value that this email message is caused by the previous email message, matching order numbers, matching email information, etc. In one embodiment, a user can set the parameters that are used in this step. In one embodiment, if the email parameters meet one or more thresholds, the email server 122 determines that the email is part of a particular thread (Step 335). If not, the process returns to Step 315.

Learning the Causality Graph

In more detail, the input to the email server computer 122 is a set of N anonymized users $\{1, \ldots, N\}$. For each user, i, a set of ni inbound messages $\{e^i_1, \ldots, e^i_{ni}\}$ is provided. For clarity, $e^i_j$ denotes the j'th email in user i's inbox. $\tau(e^i_j)$, vars($e^i_j$) and t($e^i_j$) are representations of the template, variables, and arrival time of email j to user i. In one embodiment, these functions can be efficiently evaluated for any email and the set of all possible templates, T, is known. In one embodiment, some email messages do not fit into any template, for example, personal email messages. In one embodiment, these email messages are ignored since they are irrelevant for the sake of automated mail threading. Thus, in one embodiment, the email messages analyzed by the email server 122 match a valid template.

The inbound email streams are chronologically sorted, i.e., $t(e^i_{j_1}) < t(e^i_{j_2})$ for all i and $j_1 < j_2$. Let $\Delta = t_{end} - t_{begin}$ denote the length of the time window in which data is collected. For each $\tau \in T$ (we refer to $\tau$ both as a function and a template), define $\lambda(\tau)$ to be the average number of times template $\tau$ was observed in a single time unit:

$$\lambda(\tau) = |\{(i,j): i \in [N], j \in [n_i], \tau(e_j^i) = \tau\}|/N\Delta.$$

The number of appearances of a template $r\tau$ per time unit in a stream is distributed Poisson with parameter $\lambda(\tau)$. This means that the probability of observing template $\tau$ at least k times within an interval of $\delta$ units is estimated by Poiss $(\lambda(\tau)\partial^k, k) = e^{-\lambda(\tau)\delta}(\lambda(\tau)\delta)^k/k!$. In one embodiment, each user stream is an independent Poisson process.

In order to identify statistical relations between the appearance of two distinct templates $\tau, \tau_{caus} \in T$, we define a window size parameter $\delta$. We then count the conditional frequency of $\tau_{caus}$ given $\tau$ as follows:

$$C(\tau, \tau_{cause}) = \left| \left\{ \begin{array}{l} (i, j_1, j_2): \; i \in [N], \; j_1 < j_2, \\ t(e^i_{j2}) < t(e^i_{j1}) + \delta \le t_{end}, \\ \tau(e^i_{j1}) = \tau_{caus}, \tau(e^i_{j2}) = \tau \end{array} \right\} \right|.$$

In words, $C(\tau, \tau_{caus})$ counts the number of times templates $\tau$ and $\tau_{caus}$ appeared within $\partial$ a time units in one user's stream. In order to infer a causal connection $\tau \to \tau_{caus}$ (i.e., $\tau$ was caused by $\tau_{caus}$), the prior probability of observing $\tau$ in an arbitrary window of length $\partial$ is compared to the probability of observing $\tau$ in a window of length $\partial$ following an appearance of $\tau_{caus}$.

Our directed, weighted causal graph $G_T = (V_T, E_T, W_T : E_T \alpha R^+)$ is constructed as follows. Its nodes correspond to templates $V_T = T$. The weight function is in fact defined $$W_\tau(\tau, \tau_{caus}) = \frac{Pr[\tau \text{ appears in the } \delta \text{ window after } \tau_{caus}]}{Pr[\tau \text{ appears in } a\; \delta \text{ window}]}$$

$$= \frac{C(\tau_1 \tau_{caus})/C(\tau)}{1 - e^{-\lambda(\tau)\delta}},$$

where $$C(\tau) = |\{(i, j_1): i \in [N], \tau(e^i_{j1}) + \delta \le t_{end}, \tau(e^i_{j1}) = \tau\}|$$

In words, $W_\tau(\tau, \tau_{caus})$ is the ratio between the number of times the pair of templates $\tau, \tau_{caus}$ co-appeared in a window of length $\partial$ and the expected number of times $\tau$ would appear after $\tau$ assuming the null hypothesis and an independence between the $\tau_{caus}$e appearance of $\tau$ and of $\tau_{caus}$. For scalability we did not set the arc set as $V_\tau \times V_\tau$. We restricted the out degree $\tau_{caus}$ of each vertex to be at most 20, where the arcs with the largest weights were chosen. It is very reasonable that other than a few negligible cases, a single template cannot be caused by more than 20 different templates. Additionally, we kept only arcs whose weight is strictly greater than 1.

The Causality Graph

As an example, the algorithm was implemented using email streams from 2.5 million users. The set of templates, T, was limited to 3,000 templates corresponding to user actions. In one embodiment, templates relating to advertisements, promotions, etc. were not used.

Figure 4:
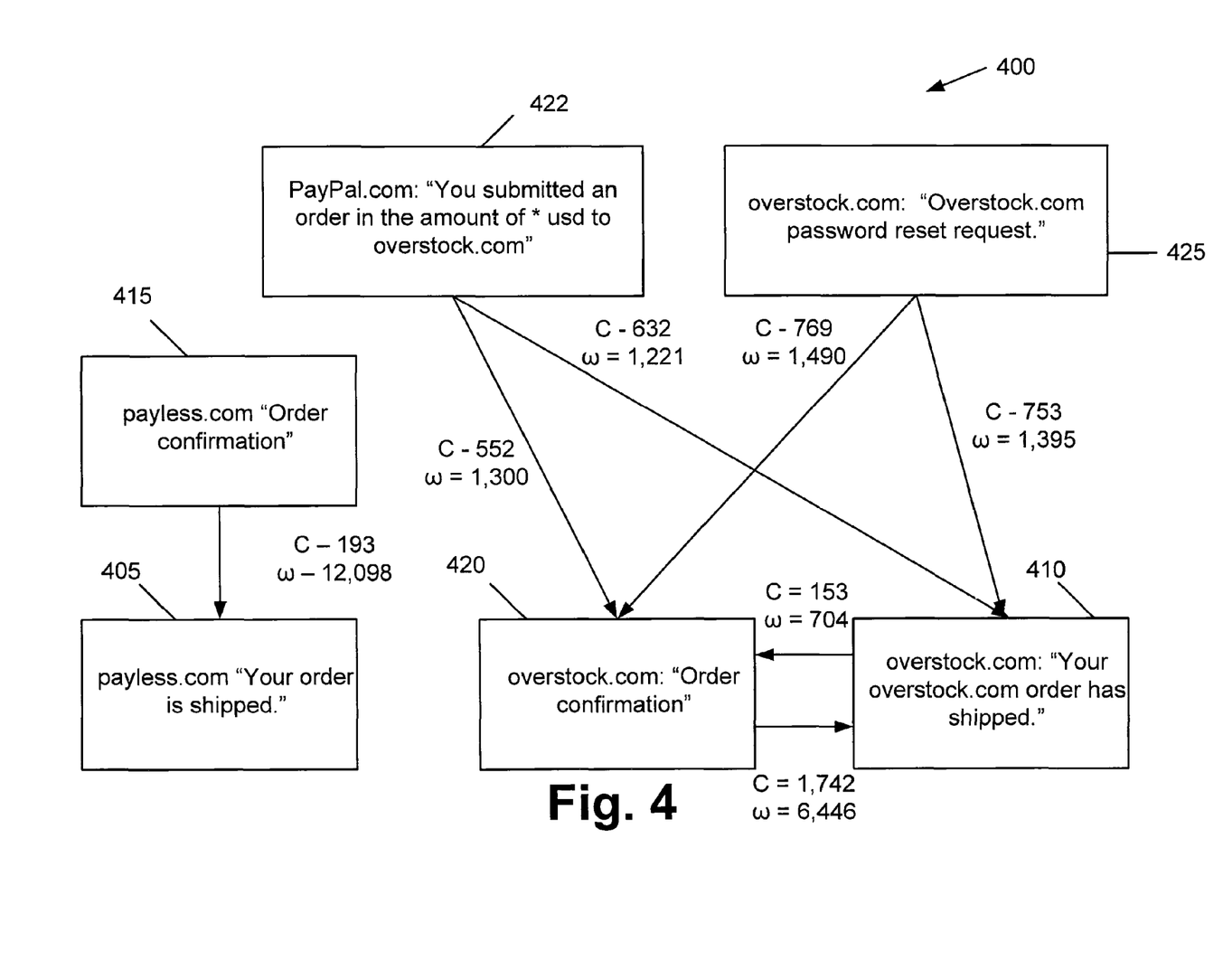
FIG. 4 is a block diagram of a causality graph in accordance with an embodiment of the present disclosure.

To remove noise factors for infrequent templates, a smoothing factor was used for the weight ratio calculation. Specifically, a constant was added to the count of both vertices and arcs (this reduces the weight of infrequent arcs). The following facts were collected from the causal graph after omitting arcs with $W_\tau(\tau, \tau_{caus})<100$ or $C(\tau, \tau_{caus})<100$, then omitting isolated nodes. FIG. 4 shows a snippet 400 from this graph.

- The total number of nodes is 1150
- The total number of nodes corresponding to subject lines containing the string "confirm" is 299. These templates are usually used by vendors as confirmation of purchase.
- The total number of nodes corresponding to subject lines containing the string "ship" is 196. These templates are usually used by vendors to notify buyers of shipment of their purchased goods.
- The total number of nodes corresponding to subject lines containing the string "password" is 43. These templates are usually used to confirm that a password has been changed or reset.
- A total of 126 arcs connect a node with "ship" in the corresponding subject line to a node with "confirm" in the corresponding subject line. For all these arcs except fewer than 10, the domain of the sender of both incident nodes was identical. Among 10 exceptions, in one case the arc connected a vendor with a 3rd party shipping company, and the other connected pairs of domain names that most probably belong to affiliated retailers.
- 32 arcs connect a node with "confirm" in the corresponding subject line to a node with "password" in the corresponding subject line. These arcs correspond to the infrequent buyer phenomenon: At each purchase from a vendor the buyer forgets the password she has chosen before the previous purchase, and must reset it.
- The total number of arcs is 1911

Note that, with respect to FIG. 4, shipping notices (e.g., shipping notice 405, 410) typically tend to follow order confirmations (e.g., order confirmations 415, 420). An order confirmation (e.g., order confirmation 420) typically follows a submitted order (e.g., submitted order 422). Users who intend to purchase online often forget their password and thus a password reset precedes the purchase (e.g., password reset 425). This is a common structure across many vendors.

In what follows, the learned graph is assumed to be fixed, and is denoted by $G_\tau = (V_\tau, E_\tau, W_\tau)$, where $V_\tau \subseteq T$, $W_\tau: E_\tau \alpha R^+$ denotes the arc weights, as described above.

Serving an Inbound Mail Stream: Threading

After a template graph has been created offline, the email server 122 is ready to provide online threading services to an email stream. The task is to process each of the user's incoming email messages one at a time and decide whether it continues an existing thread or starts a new one. Fix a user, and let $\{e_1, e_2, \ldots\}$ denote the stream of email messages arriving into her inbox. Since in this stage only one user is being dealt with, the email superscript indicating the user index is not provided.

The stream $\{e_1, e_2, \ldots\}$ of inbound email messages can be considered as a vertex set $V_\epsilon$ of a sequentially revealed graph. There is also a special vertex $e_0 \in V_\epsilon$ which corresponds to no email. In this notation the goal is to provide $V_\epsilon$ with a set of arcs $E_\epsilon$. When node $e_i$ is revealed the algorithm must output a single arc $(e_i, e_j)$ for some $0 \leq j < i$. In one embodiment, $e_j$ is the parent of $e_i$ and is denoted by $e_j = \text{par}(e_i)$. In one embodiment, the choice meets the following conditions. Either $j=0$ in which case $e_i$ starts a new thread. If $j>0$ then $(\tau(e_i), \tau(e_j)) \in E_T$ and $0 < \tau(e_i) - \tau(e_j) \leq \partial$ where $\partial$ is the same window size parameter used above ("Learning the Causality Graph"). In this case $e_i$ continues a thread by being appended to $e_j = \text{par}(e_i)$.

In one embodiment, the process of selecting the arc $(e_i, \text{par}(e_i))$ upon arrival of $e_i$ is referred to as "threading". Note that there may be cases where $\text{par}(e_{i_1}) = \text{par}(e_{i_2}) > 0$ for some $i_1 \neq i_2$. This means that threads can split. There is a good reason for allowing splitting, an example being that of piecemeal shopping cart delivery: A user purchases a cartload of goods from an aggregate vendor. The vendor sends a confirmation and receipt message for the entire purchase. Then the products are processed and shipped by separate sub-vendors. Each of those will result in a separate thread of email notifications. Those threads continue (or are caused by) the original online purchase.

Optimal Log-Likelihood Threading

The score of the threading output at step n is given by $\chi \log(WT(\tau(ei)))$, $$\sum_{i \in [n]: par(e_i) \neq e_0} \log(W_\tau(\tau(e_i), \tau(par(e_i)))). \quad (2.1)$$

Maximizing the score is equivalent to maximizing the log-likelihood of the chosen threading given a pairwise dependency statistical model on templates, with empirical priors determined by the causal graph. Moreover, the following greedy threading algorithm always ensures a maximal score. Upon arrival of ei, choose par(ei) to be $$\text{par}(e_i) = \text{argmax}_{0 \leq j < i} W_T(\tau(e_i), \tau(e_j)) \quad (3.1)$$

where the definition of $\tau(e_0)$ is overloaded to correspond to no template and set $W_T(\bullet, \tau(e_0)) = 1$. Note that, had splitting of threads not been allowed, this greedy online step would not have ensured optimality.

Additional Features

The causality relation of a pair of email messages is dependent on more than just the causality of their templates. In this section, several features are described that can improve the accuracy of the decisions. The online threading process in the improved system replaces the decision rule (3.1) with $$\text{par}(e_i) = \text{argmax}_{0 \leq j < i} F(W_\tau(\tau(e_j), \tau(e_j)), f_1, f_2 \ldots) \quad (4.1)$$

where F is some function learned using standard machine learning techniques, and $f_1, f_2, \ldots$ denotes the mentioned additional features which we now describe.

Time Difference Information

Each arc $\alpha$ in the causality graph corresponds to an ordered pair of templates that tend to appear in temporal proximity. In one embodiment, the empirical mean $\mu_{timediff}(\alpha)$ is computed and standard deviation $\sigma_{timediff}(\alpha)$ of the time difference between the appearance of the first and the second in the pair is also computed. When considering threading $e_i$ and $e_j$ such that $\alpha=(\tau(e_i), \tau(e_j))$, the feature $(\tau(e_i)-\tau(e_j)-\mu_{timediff}(\alpha))/\sigma_{timediff}(\alpha)$ is included. This measures how much the arrival time differences between $e_i$ and $e_j$ deviates from its expectation.

To further sharpen this feature, in one embodiment another feature is created where the calculation of $\mu_{timediff}(\alpha)$ and $\sigma_{timediff}(\alpha)$ excluded the top and bottom 10 percentiles of the observed time differences. This cleanup was designed to reduce the effect of the following scenario occurring in the causality graph creation step. Consider a user that changed her password twice within two weeks. Changing a password usually includes a thread of two email messages in the spirit of: 'your password has been reset' and 'your password has been changed'. These two email messages tend to arrive at very close time intervals. If the forgetful user changed her password twice in two weeks, we observe a very large time difference. Such outliers add noise to the mean and standard deviation calculations. Our cleanup method is likely to avoid such noise.

Variable Match Information

A variable match may be significant when determining the causality of two email messages. For example, in template pairs of the type: 'order #number# confirmation' and 'shipment for order #number#', a match in the variable '#number#' is typically significant. On the other hand, there are cases where a variable match is not as significant. Consider the two templates: 'the itinerary of your flight from #location1# to #location2#' and 'changes in your flight from #location1# to #location2#'. A match in only one of the locations does not mean that the two email messages are connected. It is not unlikely for the two email messages to discuss different flights while '#location1#' is simply the user's city of residence.

In one embodiment, variable match information can be introduced into threading decision making as follows. Consider an arc $\alpha=(\tau_1, \tau_2)$ in the causality graph, and assume that templates $\tau_i$ and $\tau_2$ are provided with nonempty variable lists.

In the causality graph learning step, given an instance of $\tau_1$ and $\tau_2$ appearing within time interval $\delta$, the corresponding variable match pattern is a bipartite graph with the variables of $\tau_1$ on the left, the variables of $\tau_2$ on the right, and an edge between two variables if their value is identical in the two corresponding email messages. For each possible variable match pattern M, a weight is computed which is defined like $W_T(\alpha)$ except that only occurrences of $\tau_1$, $\tau_2$ with variable match pattern M are counted in Equation (2.1).

The feature that is output for email messages e1, e2 with templates T1, T2 is, in one embodiment, the weight of the corresponding variable match pattern. Additionally, a binary feature can be provided indicating whether the variable match pattern contains at least one variable match.

Matching Variables to Sender Domain Names

An additional type of match can occur between the variables of the template corresponding to one email and the domain of the sender of the other. An example where this connection is meaningful for our purpose: One email from 'racingbuy.com' with subject 'Your order confirmation', the other email from 'paypal.com' with subject 'Your purchase from racing buy'. The corresponding feature introduced in the system is a textual measure of similarity between the sender domain name of one email and a variable of the other. In case more than one variable exists, the maximal similarity measure can be chosen as the feature.

Using Periodicity Information

In one embodiment, a template is periodic if its corresponding email messages appear periodically in a user's inbound mailbox. Common examples include a phone bill or a credit card statement, with monthly periodicity. In such cases, a false causality arc might be created due to a spurious relationship between periodic templates. In statistics, two events have spurious relationship when neither causes the other, but both are caused by a third event. In our example, the third event is the beginning of a month. In one embodiment, a feature is added indicating periodicity that is obtained in the following manner.

For each template, the mean and standard deviation of the difference between timestamps of its consecutive appearances in a user's email stream are measured. This information can be translated to four features: the logarithm of the mean and the logarithm of the standard deviation of both the first and second template of each arc in the causality graph. Note that logarithms are used because the important information is the ratio between the standard deviation and the mean, which is captured by difference of logarithms, which in turn, can be captured by a linear classifier.

Spurious Relationships

The above algorithm is an embodiment to identify strong causality between email messages. Thus, threads of inbound automatically generated messages, emanating from a single event driven by the user, are identified. In one embodiment, the method used for identifying these causal relations are statistical. A problem with this approach is the following. Consider three events X, Y and Z and the following two cases: (i), event X causes Z (ii), event Y causes both X and Z. In the second case, X and Z are not related by a causal relationship but rather by a spurious relationship. If Y is not observed, then both cases are indistinguishable, because the pair (X, Z) appears to be statistically dependent. Thus, a false causality relation might be inferred.

One source of false causality is monthly recurring email messages. Credit card companies usually send a report to the cardholder on the same day monthly (e.g. every first of the month). Many users hold cards from more than one credit card company, and many hold cards from the same two major credit card companies. Hence, it may appear that one credit card statement causes the other. In reality these email messages are both caused by an unobserved event, namely, the beginning of the month. These false effects can be eliminated by identifying monthly recurring email messages, and forcing them not to continue threads. (In one embodiment, starting threads is still allowed and useful: Often a "thank you for your payment" template appears shortly after the bill arrives and continues the thread.)

A slightly different type of statistical phenomenon one should be aware of is known as frequent item sets. This problem is typically in purchase data at supermarkets (either traditional or online). The idea there is to identify pairs (or tuples) of items that are bought together in the same cart with some noticeable statistical significance. This allows the store to apply sophisticated pricing and discounting strategies. In one embodiment, pairs of frequent actions are not viewed as threads. Consider the following example: Users who order streaming movies from online providers are more likely to place an online order for pizza (from a different vendor) shortly thereafter. In one embodiment, the relationship between the action of ordering the movie and ordering the pizza is not considered causal for the purpose of threading the corresponding email messages. In one embodiment, the weight assigned to such connections in our data, albeit high with strong statistical significance, is below that of arcs corresponding to actual thread connections. Careful thresholding of arc weights in GT typically eliminates this problem.

Referring again to FIG. 1, in one embodiment, the ad server 140 communicates one or more advertisements as part of the email message sent from the email server 122 and/or content servers 130, 135. The advertisement(s) may be, for example, related to the contents of the email message and/or the subject matter of the thread.

A process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers.

For web portals like Yahoo!, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users.

One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Ad server 140 comprises a server that stores online advertisements for presentation to users. "Ad serving" refers to methods used to place online advertisements on websites, in applications, or other places where users are more likely to see them, such as during an online session or during computing platform use, for example.

During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

In one embodiment, the email server 122 generates a user profile for a user based on one or more email threads associated with the user. The email server 122 and/or ad server 140 can then transmit one or more advertisements to the user based on the user profile. For example, suppose a user has one or more email threads associated with purchases from JetBlue®. The email server 122 can determine that the user travels often based on the email threads associated with JetBlue®. In one embodiment, the email server 122 and/or ad server 140 can transmit advertisements relating to travel (e.g., hotels, airfare, restaurants, etc.) to the user based on these threads.

Figure 5:
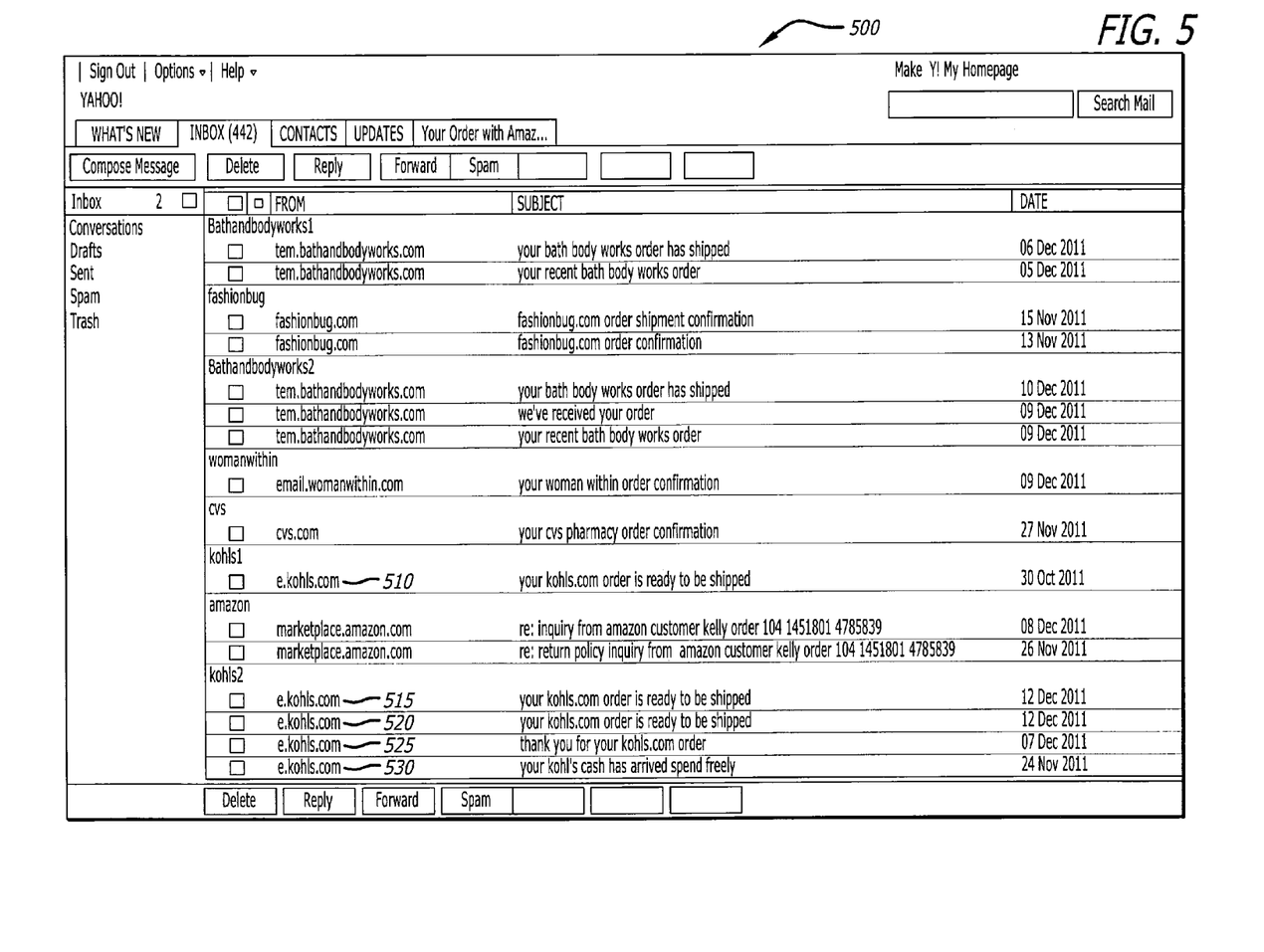
FIG. 5 is a user interface of a client device showing received email messages organized into threads in accordance with an embodiment of the present disclosure.

FIG. 5 is an example of a user interface 500 of a client device showing received email messages organized into threads. For example, the user interface 500 shows email messages 510, 515, 520, 525, 530 from Kohls®. Email messages 515, 520, 525, and 530 are part of a single thread because they all relate to a particular order. The email 510 from Kohls® is not part of the same thread because the email 510 is relating to a different order. This is determined because the date of the email 510 is Oct. 30, 2011, which is not close enough to the other email messages 515, 520, 525, 530 from Kohls®, which occur from Nov. 24, 2011 to Dec. 12, 2011. These email messages 515, 520, 525, 530 all relate to a single order, but email 510 relates to a different order.

Figure 6:
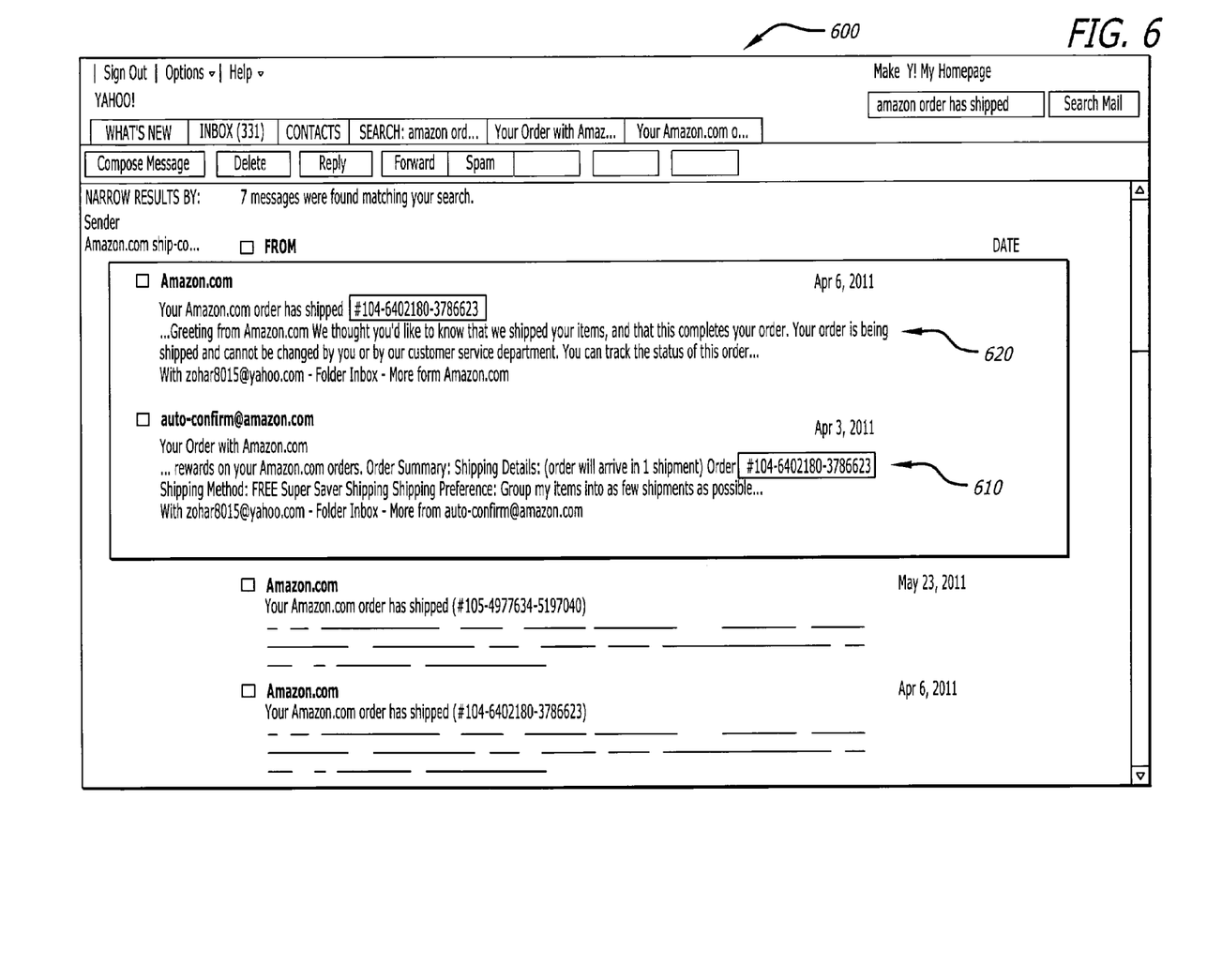
FIG. 6 is a user interface illustrating two email messages in a thread in accordance with an embodiment of the present disclosure.

FIG. 6 is an example of a user interface 600 illustrating two email messages 610, 620 from Amazon®. The first email 610 confirms the user's order, and the second email 620 indicates that the order has shipped. The second email 620, which arrived three days after the first email 610, has an order number that matches the order number in the first email 610. This is an example of the parameters described in FIG. 3. Thus, the email server 122 determines that the second email 620 is in the same thread as the first email 610.

Figure 7:
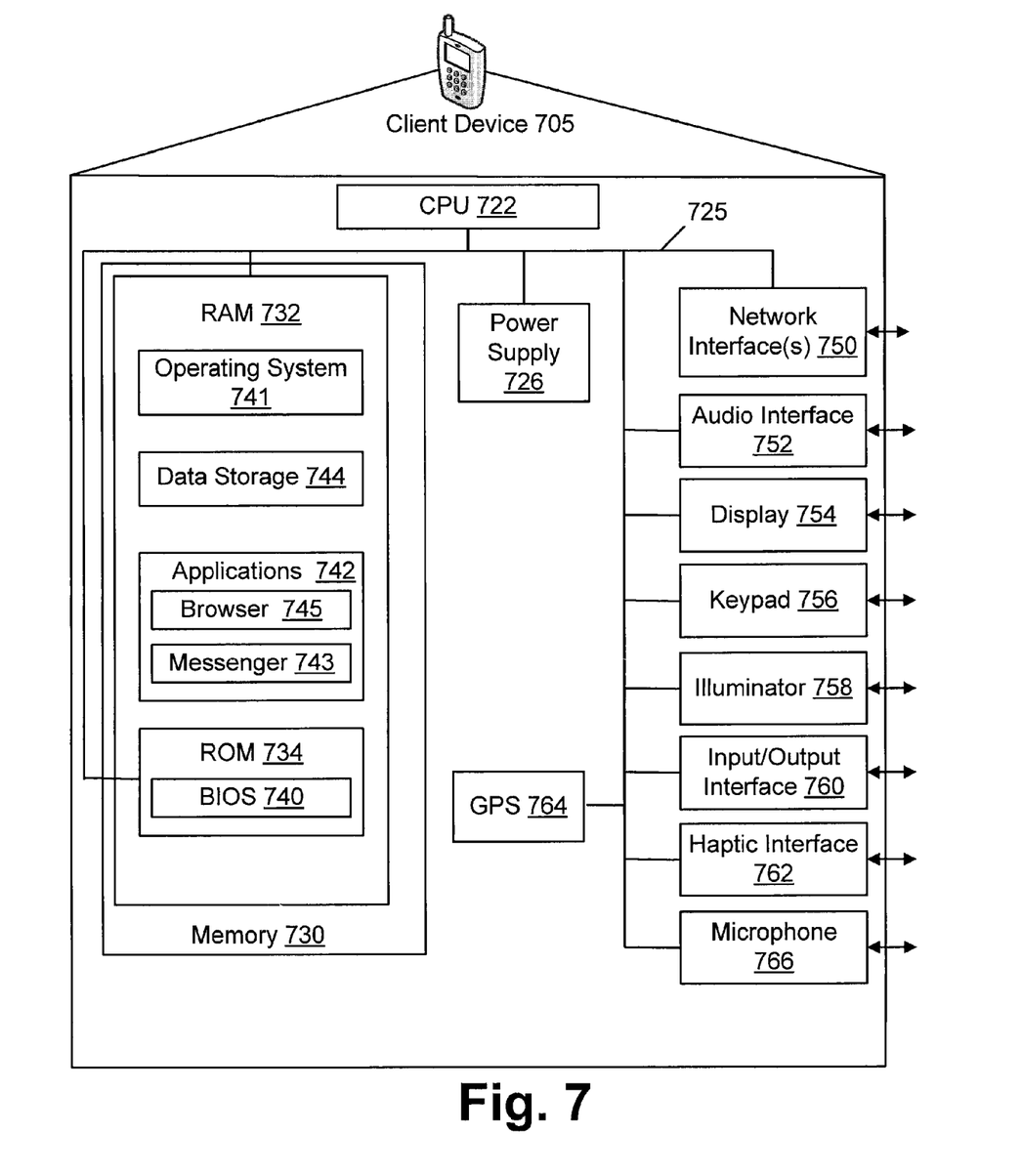
FIG. 7 shows an example of a schematic diagram illustrating a client device in accordance with an embodiment of the present disclosure.

FIG. 7 shows one example of a schematic diagram illustrating a client device 705 (e.g., client device 105). Client device 705 may include a computing device capable of sending or receiving signals, such as via a wired or wireless network. A client device 705 may, for example, include a desktop computer or a portable device, such as a cellular telephone, a smartphone, a display pager, a radio frequency (RF) device, an infrared (IR) device, a Personal Digital Assistant (PDA), a handheld computer, a tablet computer, a laptop computer, a digital camera, a set top box, a wearable computer, an integrated device combining various features, such as features of the foregoing devices, or the like.

The client device 705 may vary in terms of capabilities or features. Claimed subject matter is intended to cover a wide range of potential variations. For example, a cell phone may include a numeric keypad or a display of limited functionality, such as a monochrome liquid crystal display (LCD) for displaying text, pictures, etc. In contrast, however, as another example, a web-enabled client device may include one or more physical or virtual keyboards, mass storage, one or more accelerometers, one or more gyroscopes, global positioning system (GPS) or other location-identifying type capability, of a display with a high degree of functionality, such as a touch-sensitive color 2D or 3D display, for example.

A client device 705 may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

As shown in the example of FIG. 7, client device 705 may include one or more processing units (also referred to herein as CPUs) 722, which interface with at least one computer bus 725. A memory 730 can be persistent storage and interfaces with the computer bus 725. The memory 730 includes RAM 732 and ROM 734. ROM 734 includes a BIOS 740. Memory 730 interfaces with computer bus 725 so as to provide information stored in memory 730 to CPU 722 during execution of software programs such as an operating system 741, application programs 742, device drivers, and software modules 743, 745 that comprise program code, and/or computer-executable process steps, incorporating functionality described herein, e.g., one or more of process flows described herein. CPU 722 first loads computer-executable process steps from storage, e.g., memory 732, data storage medium/media 744, removable media drive, and/or other storage device. CPU 722 can then execute the stored process steps in order to execute the loaded computer-executable process steps. Stored data, e.g., data stored by a storage device, can be accessed by CPU 722 during the execution of computer-executable process steps.

Persistent storage medium/media 744 is a computer readable storage medium(s) that can be used to store software and data, e.g., an operating system and one or more application programs. Persistent storage medium/media 744 can also be used to store device drivers, such as one or more of a digital camera driver, monitor driver, printer driver, scanner driver, or other device drivers, web pages, content files, playlists and other files. Persistent storage medium/media 706 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Client device 705 can also include one or more of a power supply 726, network interface 750, audio interface 752, a display 754 (e.g., a monitor or screen), keypad 756, illuminator 758, I/O interface 760, a haptic interface 762, a GPS 764, and/or a microphone 766.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Figure 8:
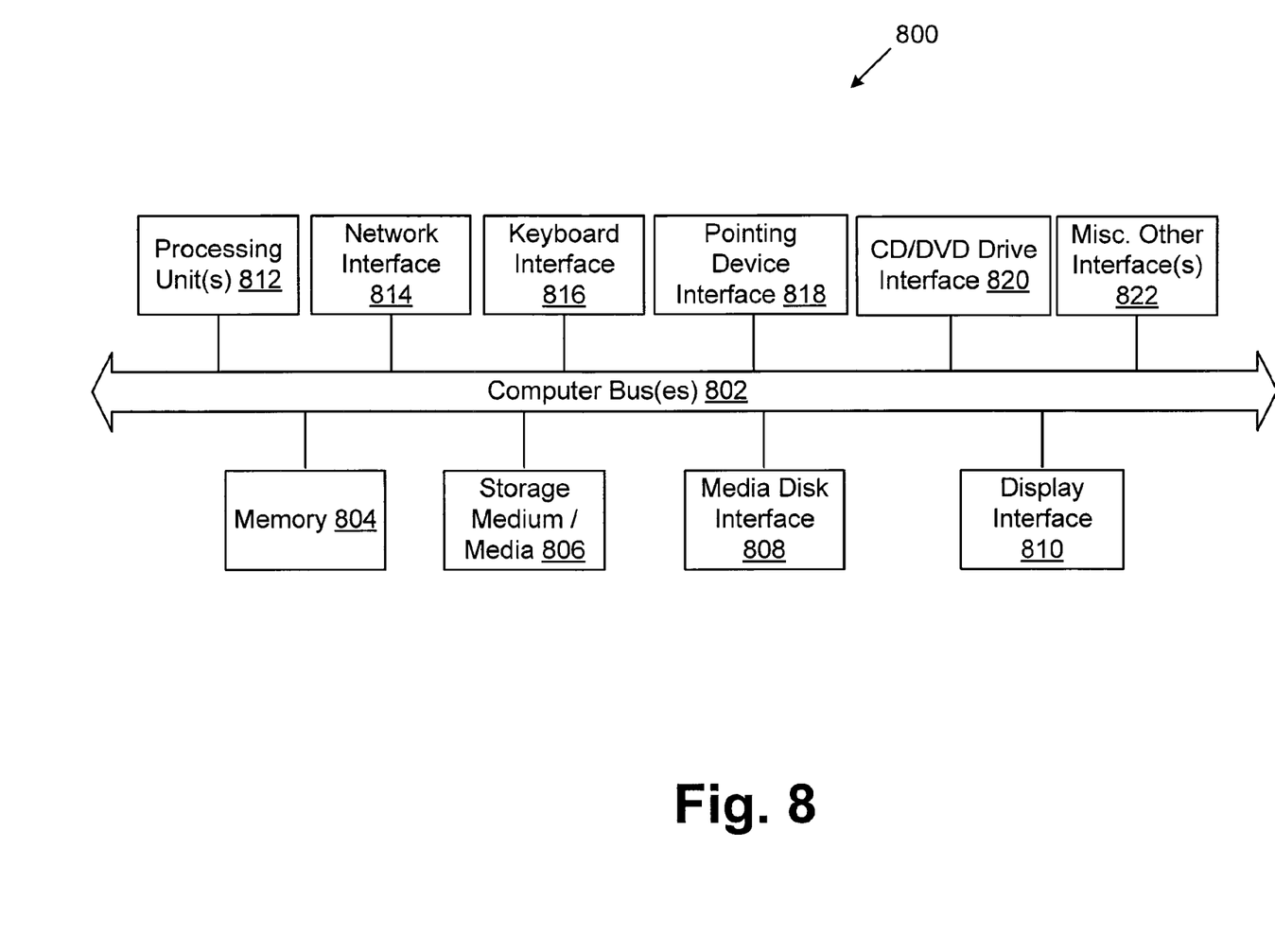
FIG. 8 is a block diagram illustrating an internal architecture of a computer in accordance with an embodiment of the present disclosure.

FIG. 8 is a block diagram illustrating an internal architecture of an example of a computer, such as server computer 122, 130, 135, 140 and/or client device 105, 110, 125, in accordance with one or more embodiments of the present disclosure. A computer as referred to herein refers to any device with a processor capable of executing logic or coded instructions, and could be a server, personal computer, set top box, tablet, smart phone, pad computer or media device, to name a few such devices. As shown in the example of FIG. 8, internal architecture 800 includes one or more processing units (also referred to herein as CPUs) 812, which interface with at least one computer bus 802. Also interfacing with computer bus 802 are persistent storage medium/media 806, network interface 814, memory 804, e.g., random access memory (RAM), run-time transient memory, read only memory (ROM), etc., media disk drive interface 808 as an interface for a drive that can read and/or write to media including removable media such as floppy, CD-ROM, DVD, etc. media, display interface 810 as interface for a monitor or other display device, keyboard interface 816 as interface for a keyboard, pointing device interface 818 as an interface for a mouse or other pointing device, and miscellaneous other interfaces not shown individually, such as parallel and serial port interfaces, a universal serial bus (USB) interface, and the like.

Memory 804 interfaces with computer bus 802 so as to provide information stored in memory 804 to CPU 812 during execution of software programs such as an operating system, application programs, device drivers, and software modules that comprise program code, and/or computer-executable process steps, incorporating functionality described herein, e.g., one or more of process flows described herein. CPU 812 first loads computer-executable process steps from storage, e.g., memory 804, storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

As described above, persistent storage medium/media 806 is a computer readable storage medium(s) that can be used to store software and data, e.g., an operating system and one or more application programs. Persistent storage medium/media 806 can also be used to store device drivers, such as one or more of a digital camera driver, monitor driver, printer driver, scanner driver, or other device drivers, web pages, content files, playlists and other files. Persistent storage medium/media 806 can further include program modules and data files used to implement one or more embodiments of the present disclosure.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the user computing device or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
    identifying, by a computing device, a plurality of email templates, each email template corresponding to characteristics of a received machine-generated email, the characteristics of the received machine-generated email relating to static data of the machine-generated email; and
    generating, by the computing device, a template causality graph by analyzing the plurality of email templates to determine a statistical causality between templates of the plurality of email templates, the determining of the statistical causality between templates comprising determining that a first received machine-generated email associated with a first template is a result of a second received machine-generated email associated with a second template.

2. The method of claim 1, further comprising receiving, by the computing device for an email account associated with a user, a plurality of machine-generated emails sent to the user.

3. The method of claim 1, further comprising determining an email template for each of the machine-generated emails.

4. The method of claim 3, further comprising determining that an email in the machine-generated emails is part of an email thread based on the template causality graph for the email template.

5. The method of claim 4, further comprising analyzing a time difference between the email and other emails in the email thread.

6. The method of claim 4, further comprising analyzing an email variable in the email to determine if the email variable matches an email variable in other emails in the email thread.

7. A computing device comprising:
    a processor;
    a storage medium for tangibly storing thereon program logic for execution by the processor, the program logic comprising:
    identification logic, executed by the processor, for identifying a plurality of email templates, each email template corresponding to characteristics of a received machine-generated email, the characteristics of the received machine-generated email relating to static data of the machine-generated email; and
    generation logic, executed by the processor, for generating a template causality graph by analyzing the plurality of email templates to determine a statistical causality between templates of the plurality of email templates, the determining of the statistical causality between templates comprising determining that a first received machine-generated email associated with a first template is a result of a second received machine-generated email associated with a second template.

8. The computing device of claim 7, further comprising receiving logic, executed by the processor, for receiving for an email account associated with a user, a plurality of machine-generated emails sent to the user.

9. The computing device of claim 7, further comprising determining logic, executed by the processor, for determining an email template for each of the machine-generated emails.

10. The computing device of claim 9, further comprising determining logic executed by the processor for determining that an email in the machine-generated emails is part of an email thread based on the template causality graph for the email template.

11. The computing device of claim 10, further comprising analyzing logic executed by the processor for analyzing a time difference between the email and other emails in the email thread.

12. A non-transitory computer readable storage medium tangibly storing computer program instructions capable of being executed by a computer processor, the computer program instructions defining the steps of:
    identifying, by a computing device, a plurality of email templates, each email template corresponding to characteristics of a received machine-generated email, the characteristics of the received machine-generated email relating to static data of the machine-generated email; and
    generating, by the computing device, a template causality graph by analyzing the plurality of email templates to determine a statistical causality between templates of the plurality of email templates, the determining of the statistical causality between templates comprising determining that a first received machine-generated email associated with a first template is a result of a second received machine-generated email associated with a second template.

* * * * *